(12) United States Patent
Kuster

(10) Patent No.: US 6,186,695 B1
(45) Date of Patent: Feb. 13, 2001

(54) DOWELS FOR SECURING OBJECTS TO WALLS

(76) Inventor: Hermann Kuster, Obertorstrasse 62, D-37434 Gieboldehausen (DE)

(*) Notice: Under 35 U.S.C. 154(b), the term of this patent shall be extended for 0 days.

(21) Appl. No.: 09/043,317

(22) PCT Filed: Nov. 22, 1995

(86) PCT No.: PCT/DE95/01622

§ 371 Date: Mar. 20, 1998

§ 102(e) Date: Mar. 20, 1998

(87) PCT Pub. No.: WO96/17177

PCT Pub. Date: Jun. 6, 1996

(30) Foreign Application Priority Data

Sep. 23, 1995 (DE) .............................. 195 35 467

(51) Int. Cl.⁷ .................................................. F16B 13/06
(52) U.S. Cl. ..................... 403/297; 403/408.1; 403/292; 411/61; 411/55; 411/72
(58) Field of Search ................... 403/297, 292, 403/370, 371, 374.4, 408.1; 411/61, 60.2, 60.3, 55, 72

(56) References Cited

U.S. PATENT DOCUMENTS

| 2,221,141 | 11/1940 | Kindt ..................................... 22/158 |
| 3,869,959 | * 3/1975 | Moen . |
| 4,287,807 | * 9/1981 | Pacharis et al. ................. 411/60.3 X |
| 4,482,265 | 11/1984 | Koza ....................................... 403/71 |
| 4,657,458 | * 4/1987 | Woller et al. . |
| 5,106,225 | * 4/1992 | Andre et al. ....................... 403/408.1 |
| 5,702,216 | * 12/1997 | Wu ................................... 411/60.2 X |

FOREIGN PATENT DOCUMENTS

| 591637 | * 9/1977 | (CH) ...................................... 411/61 |
| 679053 | * 12/1991 | (CH) . |
| 24 52 398 | 5/1976 | (DE) ............................... F16B/13/02 |
| 3202433 A1 | 8/1983 | (DE) ............................... F16B/21/06 |
| 31 07 153 A1 | 9/1982 | (DK) ............................... F16B/13/10 |
| 8571 | 12/1909 | (GB) . |

* cited by examiner

Primary Examiner—Lynne H. Browne
Assistant Examiner—John R. Cottingham
(74) Attorney, Agent, or Firm—Darby & Darby

(57) ABSTRACT

A dowel for securing objects to construction elements, in particular gypsum plaster boards, has an expanding dowel body with an inner bore into which a fastening crew can be screwed. In an insertion front area, the dowel body is subdivided into at least two head segments buy a slot that starts at its front end. The dowel body also has a continuous necking in the front area of its outer surface. The dowel body further has at its rear end opposite its front end a stopping plate that extends transversely to the dowel longitudinal axis.

15 Claims, 4 Drawing Sheets

DOWELS FOR SECURING OBJECTS TO WALLS

BACKGROUND OF THE INVENTION

1. Field of the Invention

The invention relates to a dowel for securing objects to construction elements, in particular gypsum plaster boards, with an expandable dowel body which has an inner bore into which a fastening screw can be screwed. At an insertion front area, the dowel body is subdivided into at least two head segments by slots starting at a front end and has at the front area along the outer surface a continuous necking. At the rear end opposite to the front end, the dowel body includes a stopping plate extending transversely to a dowel longitudinal axis.

The invention also relates to a method for making a dowel with an inner bore and an inner thread.

2. Description of the Related Art

From U.S. Pat. No. 3,869,959 there is known a dowel for securing objects to construction elements, in particular to gypsum plaster boards, with a spreadable dowel body which has an inner bore into which a fastening screw can be screwed, wherein the dowel body is subdivided into at least two head segments by slots starting at a front end and includes at the front area along its outer surface a continuous necking, and wherein the dowel body at the rear end opposite to the front end includes a stopping plate extending transversely to a dowel longitudinal axis.

The dowel known from U.S. Pat. No. 3,869,959 is made of a uniform dowel body with a cylindrical section which corresponds to a bore in the construction part to which the dowel is to be secured. At the rear end of the dowel body, there is disposed a threaded inner bore and a stopping plate. At the rear area opposite to the front area, the dowel body has a collar which is connected with the rear area through a conical necking. At the front area, the dowel body has a plurality of slots which can spread radially when a fastening screw is inserted in the inner bore. On the circumference of the dowel body there are arranged a plurality of ribs for preventing rotation of the dowel in the dowel bore. With the known dowel, the fastening screw can disadvantageously be pulled out of the inner bore when tensile forces are applied along the longitudinal axis of the dowel. To making it more difficult for the fastening screw to be pulled out, the known dowel has to be provided with a relatively coarse thread which makes it hard to turn the screw. The dowel may disadvantageously also rotate together with the fastening screw when the fastening screw tightened. To counteract this situation, additional ribs are provided on the circumference. These ribs, however, can damage the construction element surrounding the dowel.

SUMMARY OF THE INVENTION

It is therefore an object of the present invention to improve the known dowel so that the resistance to tensile forces and the load bearing capacity, respectively, are increased in the axial direction and the fastening screw can be tightened easily without causing rotation of the dowel. The object is solved by the invention in that the inner bore includes a recess located in a rear area opposite to the front area, wherein the recess holds an insert with a female thread. Since the insert is immovably installed in the recess, a fastening screw which is easy to turn can be used, while the load bearing capacity in the axial direction is simultaneously increased. More particularly, by using the insert, the material for the dowel body can be selected for the required spreadability and resiliency, and the material for the insert can be selected for the strength necessary to prevent stripping of the thread. Since the fastening screw can now be tightened easily and the dowel body can be spread apart easily, ribs or other protruding elements can be eliminated from the outside diameter.

It is yet another object of the invention to provide a simple method for manufacturing a dowel with an inner bore and a female thread.

This object is solved with the invention in that the dowel is made of two vertical halves with a recess adapted to receive an insert with a female thread, wherein the insert is inserted into the first half and the second half is then joined with the first half. With the method of the invention, the dowel body can be manufactured by injection molding preferably from plastic—without the need for cutting a thread in the dowel. Moreover, the insert does not have to be inserted in the mold form prior to molding. The insert is particularly easy to install since the dowel body is constructed from two halves.

In another advantageous embodiment, the two halves are joined with each other at a longitudinal side in such a way that, after insertion of the insert, the two halves can be folded together by pivoting the two halves about the joined portion and then secured by, for example, pushing a ring over the dowel body.

BRIEF DESCRIPTION OF THE DRAWINGS

Additional features of the invention are described in the following detailed description and the appended drawings, which illustrate preferred exemplary embodiments of the invention. In the drawings is shown in.

DESCRIPTION OF THE PRESENTLY PREFERRED EMBODIMENTS

Figure 1:
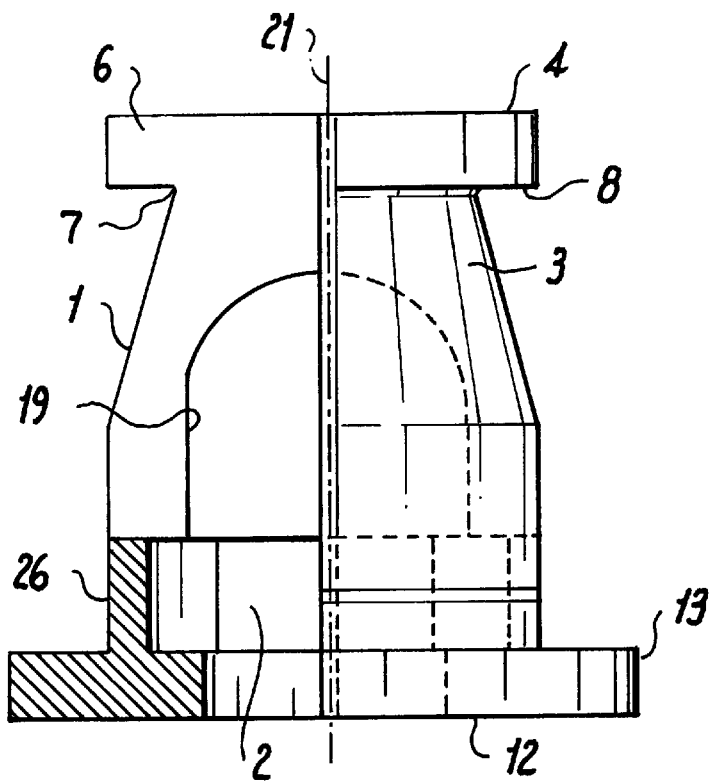
FIG. 1 a side view of a dowel in half section with an insert which is not shown in cross section.
Figure 2:
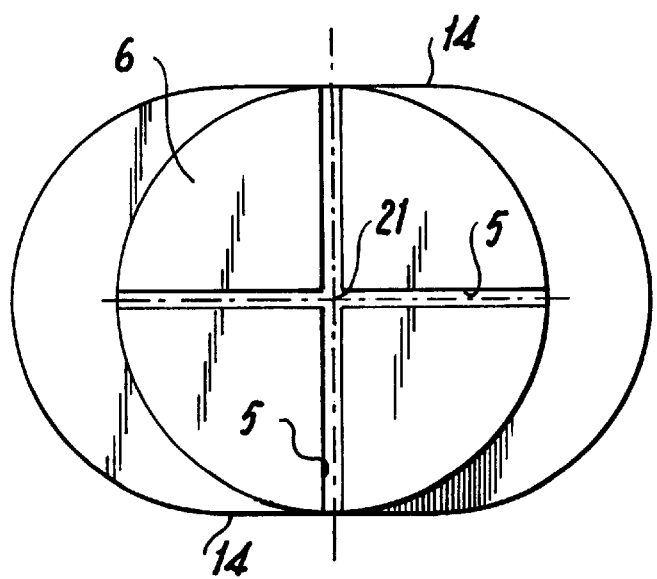
FIG. 2 a top view of the dowel of FIG. 1.
Figure 3:
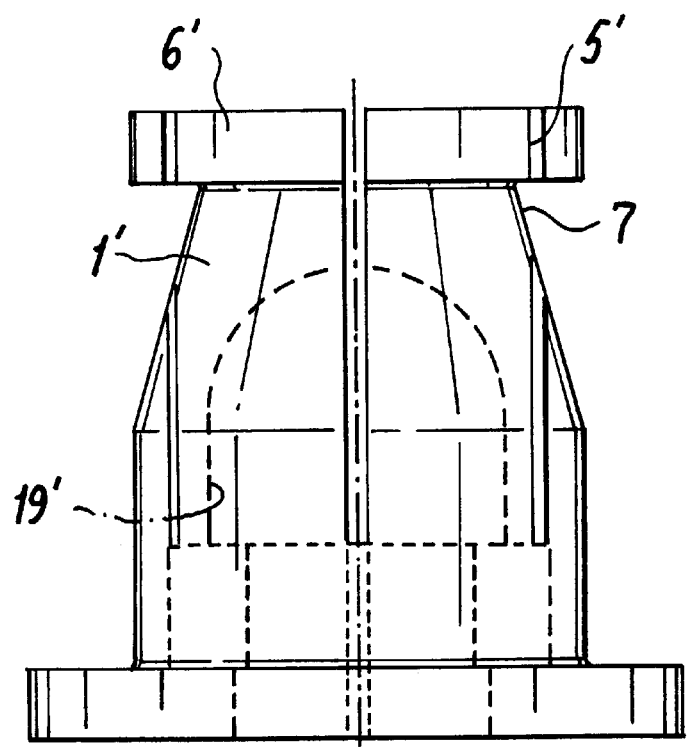
FIG. 3 a side view of another dowel.
Figure 4:
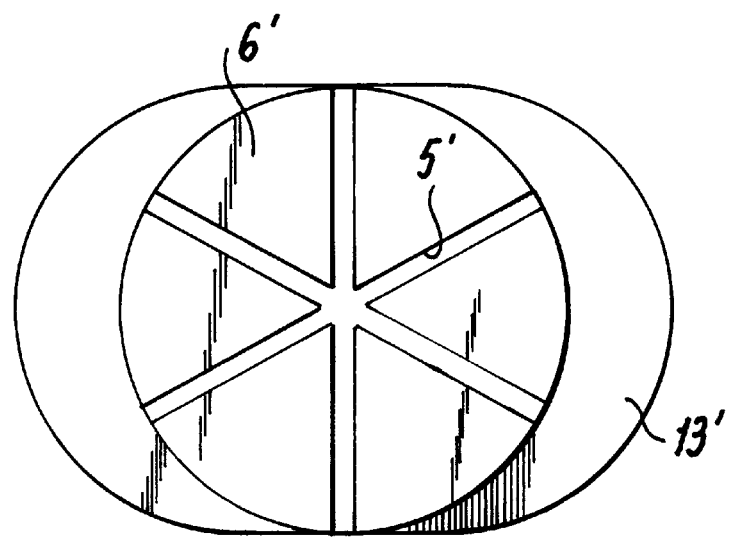
FIG. 4 a top view of the dowel of FIG. 3.
Figure 5:
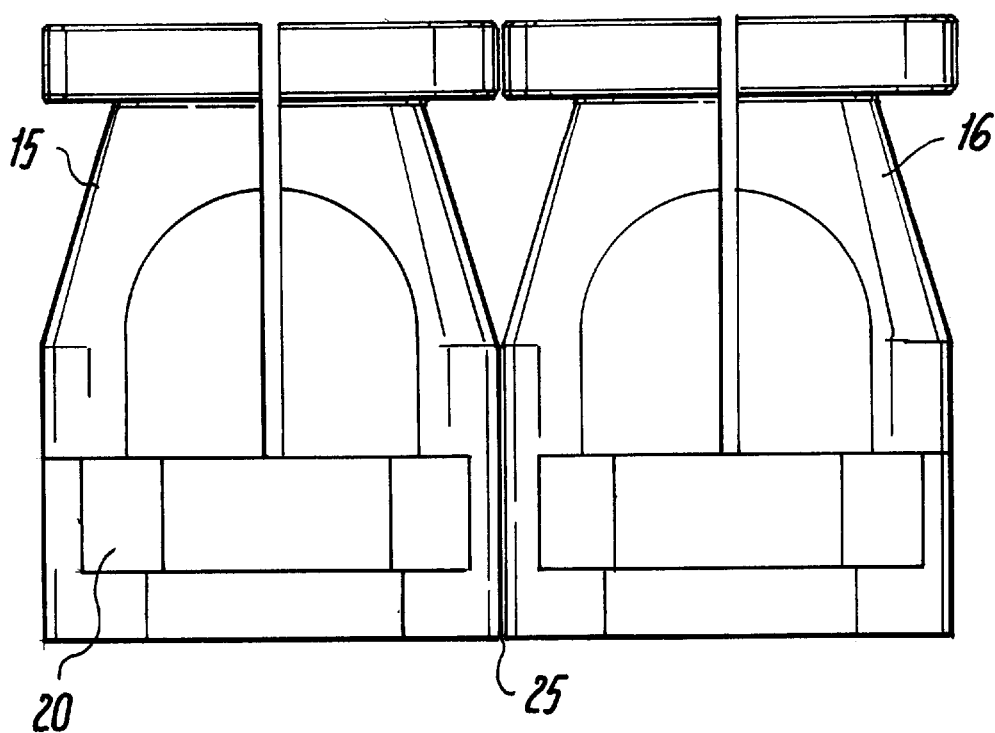
FIG. 5 a side view of a dowel body with two spread-apart halves.
Figure 6:
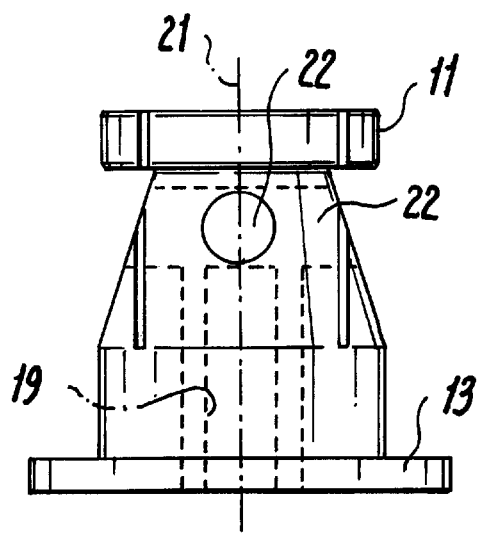
FIG. 6 a side view of another dowel.
Figure 7:
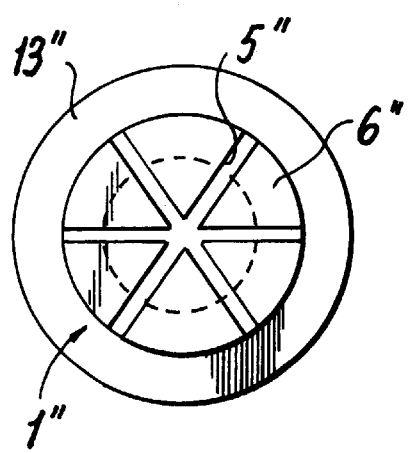
FIG. 7 a top view of the dowel of FIG. 6.
Figure 8:
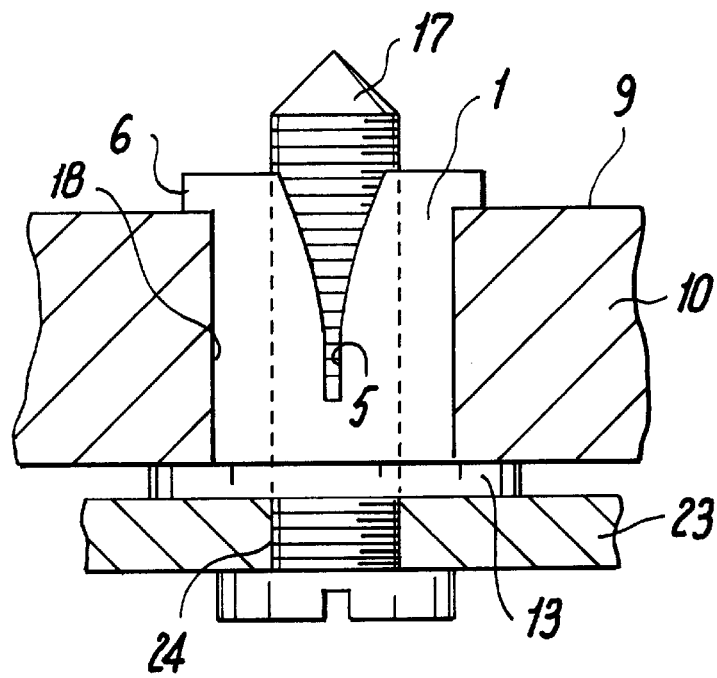
FIG. 8 a side view of a dowel installed on a construction board.
Figure 9:
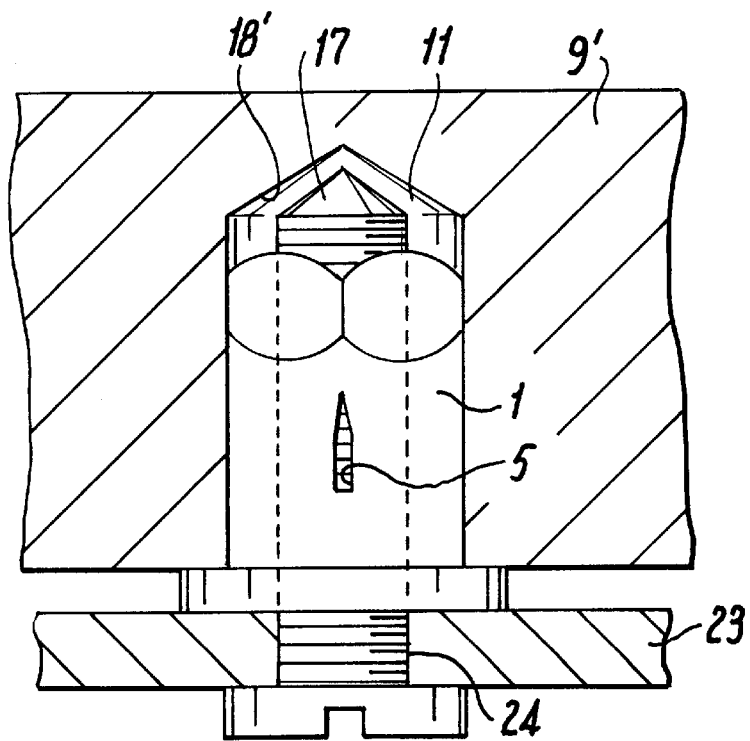
FIG. 9 a side view of a dowel installed in a blind hole of a construction element.

A dowel is composed of a dowel body (1, 1', 1") and an insert (2) with a thread. The dowel body (1, 1', 1") has an insertion front area (3) with a front end (4). The front area (3) is subdivided into head segments (6, 6', 6") by slots (5, 5', 5") starting at the front end (4). A necking (7) in the form of a truncated cone is located in the front area (3) of the dowel body (1, 1', 1"). As a result of the necking (7), the head segments (6, 6', 6") function as teeth and are able to grip with the planar surface (8)—which is located opposite to the front end (4)—the construction element (9), for example a gypsum plaster boards (10) surrounding the dowel body (1, 1', 1"), from behind. The dowel can advantageously also be used with a construction element (9') having a blind hole (11). In this case, the head segments (6, 6', 6") are deformed by the fastening screw (17) and pressed against the wall of the blind hole (11), thereby firmly securing the dowel body (1, 1', 1") in the construction element (9').

At the rear end (12) of the dowel body (1, 1', 1") opposite to the front end (4), there is disposed a stopping plate (13, 13', 13") which makes contact with the construction element (9, 9', 9"). The stopping plate (13, 13') has two parallel flat areas (14) spaced apart by a distance which corresponds approximately to the diameter of the portion of the dowel body (1, 1') which is to be inserted in a bore hole (18, 18') of a construction element (9, 9', 9"). The dowel body can thus advantageously be assembled from two foldable halves (15, 16) which are joined together. Moreover, an open-end wrench can be used to hold the dowel body (1, 1') at the stopping plate (13, 13') during installation.

The dowel body has an inner bore (19, 19') which is tapered or closed at the front end facing the front area (3). The front end of the inner bore (19, 19') can be in the shape of a truncated cone or a hemisphere. Alternatively, the front end of the inner bore (19, 19') can also be formed by two cross bores (22) extending transversely to the dowel longitudinal axis (21). When a fastening screw (17) is screwed in, the front end of the inner bore (19, 19') is pushed apart, thereby spreading apart the front area (3) of the dowel body (1, 1', 1"). The inner bore (19, 19') can either be manufactured with a thread already built in, or the thread can be cut by a self-tapping fastening screw (17) when the dowel is installed. The inner bore preferably incorporates a recess (20) for receiving a threaded insert, such as a hexagonal nut. It becomes thereby almost impossible to pull the fastening screw (17) out, so that the fastening screw (17) in this case can be an easily rotatable screw with a machine thread—such as a conventional metric thread. Preferably, the front end of the fastening screw (17) is provided with a conical tip so as to easily penetrate the front area (3) of the dowel body (1, 1', 1").

The section of the dowel body (1, 1', 1") which is to be inserted in a bore hole (18, 18'), is essentially cylindrical. However, this section can also be polygonal or have, for example, a hexagonal cross section with six head segments (6, 6").

To install the dowel, a bore hole (18, 18') is drilled in the construction element (9, 9'), and the dowel body (1, 1', 1") is inserted in the bore hole (18, 18'). The bore (24) of the object (23) to be secured is then overlapped with the inner bore (19, 19') and secured with the fastening screw (17).

The dowel body (1, 1') is manufactured by (plastic) injection molding to form two vertical halves (15, 16) which are joined together at a longitudinal side (25) and which can be spread apart. After the insert (2) is inserted in a recess (20), the two vertical halves (15, 16) are folded together and latched with the help of a latching mechanism (not shown) or joined with a ring (26) which is pushed over the dowel body (1, 1').

What is claimed is:

1. A dowel for securing objects to a construction element, the dowel comprising:

an expandable dowel body having an insertion front end, a rear end disposed opposite the front end, and an inner bore adapted for accepting a fastening screw; the front end being subdivided into at least two head segments by slots starting at the front end; the body in a front area proximate the front end having a tapered perimeter forming a continuous necking and the rear end of the body including a stopping plate disposed transversely to a dowel longitudinal axis; and the inner bore, in an area proximate the rear end of the body, includes a recess; and an insert having a female thread and being disposed within the recess.

2. The dowel according to claim 1, wherein the insert is a hexagonal nut.

3. The dowel according to claim 1, wherein the insert has a machined thread.

4. The dowel according to claim 3, wherein the machined thread is a metric thread.

5. The dowel according to claim 4, wherein in a region of the necking between the front end and the inner bore are disposed two mutually perpendicular cross bores extending perpendicular to the dowel longitudinal axis.

6. The dowel according to claim 5, wherein in the front area the inner bore has a termination which is substantially in truncated cone-shape.

7. The dowel according to claim 5, wherein in the front area the inner bore has a termination which is substantially in truncated sphere-shape.

8. The dowel according to claim 7, wherein the necking has a truncated cone-shape tapering towards the front end so as to form a substantially planar surface, and the transition from the truncated cone and the planar surface increases in radius.

9. The dowel according to claim 8, wherein the stopping plate comprises two opposing, mutually parallel flat areas separated by a distance which corresponds substantially to the diameter of the dowel body.

10. The dowel according to claim 9, wherein the dowel body is made of plastic and the insert is made of metal.

11. The dowel according to claim 10, wherein the dowel body is formed by two halves divided in a direction parallel to the dowel longitudinal axis.

12. The dowel according to claim 11, wherein the two halves of the dowel body are connected by a ring.

13. The dowel according to claim 11, wherein the two halves of the dowel body are connected by at least one locking mechanism.

14. The dowel according to claim 13, wherein the locking mechanism comprises a locking pin disposed on one half, the locking pin being engagable with a locking pin receptacle disposed on the other half.

15. A method for making a dowel with an inner bore, comprising the steps of:

forming two halves of a dowel body, the two haves being divided in a direction parallel to a longitudinal axis of the dowel;

providing in the dowel body a recess adapted to receive an insert having a female thread;

inserting the insert into the first half;

joining the second half with the first half; and wherein said joining step further comprises pushing a ring over the two halves.

* * * * *